(12) United States Patent
Yamada

(10) Patent No.: US 10,399,462 B2
(45) Date of Patent: Sep. 3, 2019

(54) VEHICLE SEAT CONTROL SYSTEM

(71) Applicant: TOYOTA JIDOSHA KABUSHIKI KAISHA, Toyota-shi, Aichi-ken (JP)

(72) Inventor: Yoshinori Yamada, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 22 days.

(21) Appl. No.: 15/814,783

(22) Filed: Nov. 16, 2017

(65) Prior Publication Data
US 2018/0072188 A1 Mar. 15, 2018

Related U.S. Application Data

(63) Continuation of application No. 15/182,715, filed on Jun. 15, 2016, now Pat. No. 9,862,290.

(30) Foreign Application Priority Data

Jul. 27, 2015 (JP) .................................. 2015-147839

(51) Int. Cl.
B60N 2/02 (2006.01)
B60N 2/01 (2006.01)
(Continued)

(52) U.S. Cl.
CPC .......... B60N 2/0224 (2013.01); B60N 2/005 (2013.01); B60N 2/01 (2013.01); B60N 2/012 (2013.01);
(Continued)

(58) Field of Classification Search
CPC .......... B60N 2/0224; B60N 2/06; B60N 2/04; B60N 2/012; B60N 2/005; B60N 2/0244;
(Continued)

(56) References Cited

U.S. PATENT DOCUMENTS 8,260,482 B1 9/2012 Szybalski et al.
9,096,150 B2 8/2015 Cuddihy et al.
(Continued)

FOREIGN PATENT DOCUMENTS

DE 4226747 C1 12/1993
EP 2840000 A2 2/2015
(Continued)

OTHER PUBLICATIONS

Nov. 29, 2016 Search Report issued in European Patent Application No. 16177484.9.
(Continued)

Primary Examiner — Brian P Sweeney
(74) Attorney, Agent, or Firm — Oliff PLC

(57) ABSTRACT

An apparatus includes a mode switching unit configured to switch a driving mode of a vehicle from a first driving mode to a second driving mode different from the first driving mode, or from the second driving mode to the first driving mode; and a changing unit configured to (i) change a position of a first seat of the vehicle, in a case in which the first driving mode is switched to the second driving mode by the mode switching unit, and (ii) change the position of the first seat to a position which is occupied by a second seat different from the first seat during the second driving mode, in a case in which the second driving mode is switched to the first driving mode by the mode switching unit.

20 Claims, 8 Drawing Sheets

(51) Int. Cl.
    *B60R 16/037*    (2006.01)
    *B60N 2/04*      (2006.01)
    *B60N 2/005*     (2006.01)
    *G05D 1/00*      (2006.01)
    *B60N 2/06*      (2006.01)

(52) U.S. Cl.
    CPC .............. *B60N 2/02* (2013.01); *B60N 2/0244* (2013.01); *B60N 2/0248* (2013.01); *B60N 2/04* (2013.01); *B60N 2/06* (2013.01); *B60R 16/037* (2013.01); *B60N 2002/0055* (2013.01); *G05D 1/0061* (2013.01)

(58) Field of Classification Search
    CPC .......... B60N 2/02; B60N 2/01; B60N 2/0248; B60N 2002/0055; B60R 16/037; G05D 1/0061
    USPC ......................................................... 701/49
    See application file for complete search history.

(56) References Cited

U.S. PATENT DOCUMENTS

| | | |
|---|---|---|
| 2005/0218686 A1 | 10/2005 | Takenoshita et al. |
| 2009/0152907 A1 | 6/2009 | Lee |
| 2015/0142273 A1* | 5/2015 | Cuddihy ................ B60N 2/005 701/49 |
| 2016/0082867 A1 | 3/2016 | Sugioka et al. |
| 2016/0159251 A1 | 6/2016 | Ebina et al. |

FOREIGN PATENT DOCUMENTS

| | | |
|---|---|---|
| JP | S62-067834 U | 4/1987 |
| JP | 2001-347859 A | 12/2001 |
| JP | 2005-211229 A | 8/2005 |
| JP | 2009-067187 A | 4/2009 |
| WO | 2015/011866 A1 | 1/2015 |

OTHER PUBLICATIONS

Apr. 5, 2017 Office Action issued in U.S. Appl. No. 15/182,715.
Aug. 18, 2017 Notice of Allowance issued in U.S. Appl. No. 15/182,715.
U.S. Appl. No. 15/182,715, filed Jun. 15, 2016 in the name of Yamada.
Nov. 14, 2017 Office Action issued in Japanese Application No. 2015-147839.

* cited by examiner

FIG.6

| DETERMINATION CONDITION | METHOD OF DETECTION | EVALUATION VALUE | |
|---|---|---|---|
| WHETHER OR NOT HAS A DRIVER'S LICENSE | DATABASE | EXCLUDE OCCUPANTS WHO HAVE NO DRIVER'S LICENSE | |
| WHETHER OR NOT OCCUPANT HAS BEEN DRINKING ALCOHOL | ALCOHOL SENSORS | EXCLUDE OCCUPANTS WHO HAVE BEEN DRINKING ALCOHOL | |
| PHYSICAL CONDITION | HEART RATE SENSORS, CAMERA | GOOD: 5 POINTS | |
| | | OTHER: 0 POINTS | |
| FACING DIRECTION AND POSITION OF SEAT | CAMERA, STATE OF CONTROL OF SEAT | FACING FORWARD, D SIDE, REAR: 5 POINTS | |
| | | FACING FORWARD, P SIDE, REAR: 3 POINTS | |
| | | FACING REARWARD: 1 POINT | |
| DRIVING SKILLS RELATING TO TRAVEL ROUTE | DATABASE | SKILLFUL: 5 POINTS | |
| | | NORMAL: 3 POINTS | |
| | | POOR: 0 POINTS | |
| DRIVING DISTRIBUTION | DATABASE | HAS NOT DRIVEN: 2 POINTS | |
| | | HAS DRIVEN: 0 POINTS | |
| WHETHER OR NOT OCCUPANT WANTS TO DRIVE | OPERATIONAL INPUT, MICROPHONE | WANTS TO DRIVE: 5 POINTS | |
| | | DOES NOT WANT TO DRIVE: 0 POINTS | |

VEHICLE SEAT CONTROL SYSTEM

CROSS-REFERENCE TO RELATED APPLICATION

This is a continuation of U.S. patent application Ser. No. 15/182,715 filed Jun. 15, 2016 (now U.S. Pat. No. 9,862, 290), which claims priority under 35 USC 119 from Japanese Patent Application No. 2015-147839, filed on Jul. 27, 2015. The entire disclosure of each of the above-identified applications is incorporated by reference herein.

BACKGROUND

Technical Field

The present disclosure relates to a vehicle seat control system disposed in a vehicle and can change a seat arrangement.

Related Art

There are technologies by which the seat arrangement, including the positions and facing directions, of plural seats installed in an automobile can be changed to various seat arrangements.

For example, Japanese Patent Application Laid-open (JP-A) No. 2001-347859 discloses a vehicle seat equipped with a seat device, a long slide device that moves the seat device between a driver's seat position and a rear seat position, seat height changing means for changing, in the driver's seat position, the seat device to a lower position than in the same occupant seat position, and a lift-up device that moves the seat device outside the cabin in a rear seat position. Because of this, in the technology disclosed in JP-A No. 2001-347859, the seat device can be moved into and out of the vehicle via a door opening for the rear seat where the steering wheel does not get in the way.

Furthermore, in recent years, a variety of technologies relating to autonomous driving have been proposed. Technologies have also been announced by which the seat arrangement can be changed to a face-to-face seat arrangement in which, in the autonomous driving mode, the seat in which the driver sits faces the opposite direction (rearward direction) of the vehicle traveling direction such that the driver faces an occupant in a seat on the vehicle rear side.

However, in an autonomous vehicle whose seat arrangement can be changed to a face-to-face seat arrangement, when the seat in which the driver sits is rotated to face the vehicle traveling direction when the vehicle is switched from the autonomous driving mode to the manual driving mode, the driver needs time to redirect his/her mental faculties and adjust his/her sense of physical orientation before becoming accustomed to the behavior of the vehicle and the scenery. For that reason, it is not always the case that the occupant seated in the driver's seat is suitable to be the driver when the vehicle is switched to the manual driving mode.

SUMMARY

The present disclosure provides a vehicle seat control system that may shorten the amount of time it takes to reach a state suitable for driving when switching from the autonomous driving mode to the manual driving mode.

A first aspect is a vehicle seat control system of a vehicle having a plurality of seats, the control system including: a driving control unit that switches the vehicle between an autonomous driving mode and a manual driving mode; a changing unit that changes positions and facing directions of the plurality seats whose positions and facing directions relative to the vehicle are changeable; and a control unit that controls the changing unit such that (i) in a case in which the driving control unit switches the vehicle from the autonomous driving mode to the manual driving mode, a first seat in which a first occupant who is a driver of the vehicle sits is controlled to face in a vehicle traveling direction and is located in a predetermined driving position upon completion of entry into the manual driving mode, and (ii) in a case in which the driving control unit switches the vehicle from the manual driving mode to the autonomous driving mode, the first seat is controlled to face in the vehicle traveling direction, and one or both of the position and the facing direction of another seat is changed upon completion of entry into the autonomous driving mode without the other seat interfering with the first seat.

According to the first aspect, the driving control unit switches the vehicle between the autonomous driving mode and the manual driving mode.

The changing unit changes the positions and facing directions of the seats, whose positions and facing directions relative to the vehicle can be changed. Namely, the seat arrangement of the vehicle can be changed by the changing unit.

Additionally, the control unit controls the changing unit such that, in the case in which the driving control unit switches the vehicle from the autonomous driving mode to the manual driving mode, the first seat in which the first occupant who is a driver of the vehicle sits faces in the vehicle traveling direction and is located in the predetermined driving position, and in the case in which the driving control unit switches the vehicle from the manual driving mode to the autonomous driving mode, the first seat faces in the vehicle traveling direction and one or both of the position and the facing direction of the other seat is changed without the other seat interfering with the first seat. Accordingly, the first seat in which the driver sits faces in the vehicle traveling direction even in the autonomous driving mode, such that, when switching to the manual driving mode, the time the driver needs to redirect his/her mental faculties and adjust his/her sense of physical orientation may be shortened. Consequently, the first aspect may shorten the amount of time to reach a state suitable for driving in a case of switching from the autonomous driving mode to the manual driving mode.

A second aspect includes the above first aspect, wherein the plural seats may be four seats placed with two of the seats in a vehicle front row and another two of the seats in a vehicle rear row, with the driving position being on one predetermined side in a vehicle width direction and in the vehicle front row, and in the case in which the driving control unit switches the vehicle from the manual driving mode to the autonomous driving mode, the control unit may control the changing unit such that the first seat faces in the vehicle traveling direction and is located in the vehicle rear row upon completion of entry into the autonomous driving mode.

A third aspect includes the above first aspect, wherein the plural seats may be four seats placed with two of the seats in a vehicle front row and another two of the seats in a vehicle rear row, with the driving position being on one predetermined side in a vehicle width direction and in the vehicle front row, in the case in which the driving control unit switches the vehicle from the autonomous driving mode to the manual driving mode, the control unit may control the changing unit such that the first seat faces in the vehicle traveling direction and is located in the driving position, a second seat in which a second occupant sits faces in the vehicle traveling direction and is located in the vehicle front row on a side opposite the one predetermined side, a third seat in which a third occupant sits faces in the vehicle traveling direction and is located in the vehicle rear row on the side opposite the one predetermined side, and a fourth seat in which a fourth occupant sits faces in the vehicle traveling direction and is located in the vehicle rear row on the one predetermined side upon completion of entry into the manual driving mode, and in the case in which the driving control unit switches the vehicle from the manual driving mode to the autonomous driving mode, the control unit may control the changing unit such that the first seat faces in the vehicle traveling direction and is located in the vehicle rear row on the one predetermined side, the second seat faces in an opposite direction of the vehicle traveling direction and is located in the vehicle front row on the one predetermined side, the third seat faces in the opposite direction of the vehicle traveling direction and is located in the vehicle front row on the side opposite the one predetermined side, and the fourth seat faces in the vehicle traveling direction and is located in the vehicle rear row on the side opposite the one predetermined side, upon completion of entry into the autonomous driving mode.

A fourth aspect includes any of the above aspects, and may further include a reading unit that reads, from the occupants riding in the vehicle, information relating to a suitability of the occupants to drive the vehicle, and, in the case in which the driving control unit switches the vehicle from the autonomous driving mode to the manual driving mode, the control unit may (1) select, based on reading results of the reading unit, an occupant who is suitable to drive from among the occupants riding in the vehicle, (2) set the seat in which the selected occupant is sitting as the first seat, and (3) control the changing unit based on the seat that has been set as the first seat. Accordingly, the fourth aspect may select an occupant who is suitable to drive as the driver and move the seats when switching from the autonomous driving mode to the manual driving mode.

A fifth aspect includes the above first to third aspects, and may further include a reading unit that reads, from the occupants riding in the vehicle, information relating to a suitability of the occupants to drive the vehicle and a detection unit that detects the positions and facing directions of the seats, wherein in the case in which the driving control unit switches the vehicle from the autonomous driving mode to the manual driving mode, the control unit may (1) select, based on reading results of the reading unit and detection results of the detection unit, an occupant who is suitable to drive from among the occupants riding in the vehicle, (2) set the seat in which the selected occupant is sitting as the first seat, and (3) control the changing unit based on the seat that has been set as the first seat. Accordingly, the fifth aspect may select an occupant who is suitable to drive in consideration of the positions and facing directions of the seats.

As described above, the above aspects provide a vehicle seat control system that may shorten the amount of time it takes to reach a state suitable for driving when switching from the autonomous driving mode to the manual driving mode.

BRIEF DESCRIPTION OF THE DRAWINGS

An exemplary embodiment will be described in detail based on the following figures, wherein:

FIG. 6 is a table for describing evaluation values according to the positions and facing directions of the seats;

DETAILED DESCRIPTION

Figure 1:
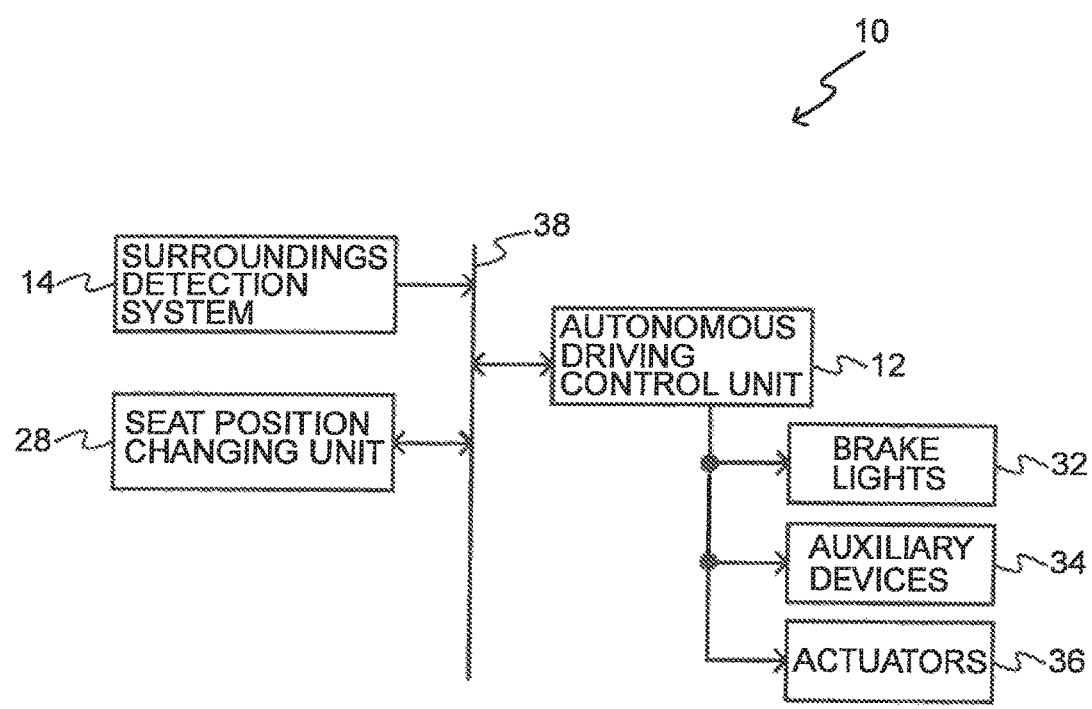
FIG. 1 is a block diagram showing the schematic configuration of a vehicle seat control system according to the exemplary embodiment.

An exemplary embodiment of the present disclosure will be described in detail below with reference to the drawings. FIG. 1 is a block diagram showing the schematic configuration of a vehicle seat control system 10 according to the present exemplary embodiment.

The vehicle seat control system 10 according to the present exemplary embodiment is equipped with an autonomous driving control unit 12 serving as a driving control unit and a control unit, a surroundings detection system 14, and a seat position changing unit 28 serving as a changing unit. The autonomous driving control unit 12, the surroundings detection system 14, and the seat position changing unit 28 are connected to an on-board network 38.

The autonomous driving control unit 12 is configured by a microcomputer (electronic control unit (ECU)) including a central processing unit (CPU), a read-only memory (ROM), and a random access memory (RAM). Furthermore, brake lights 32, auxiliary devices (e.g., turn signals, front headlamps, wiper devices, etc.) 34, and actuators 36 are connected to the autonomous driving control unit 12. The autonomous driving control unit 12 controls autonomous driving by deploying in the RAM and executing with the CPU a program stored beforehand in the ROM and controlling the actions of the brake lights 32, the auxiliary devices 34, and the actuators 36. Note that the autonomous driving control unit 12 may also be configured from plural electronic control units.

The autonomous driving control unit 12 specifically controls the switching of the vehicle between an autonomous driving mode, in which the autonomous driving control unit 12 determines the surroundings of the vehicle and the situation of the vehicle and controls the vehicle, and a manual driving mode, in which the vehicle is driven by an occupant. In the autonomous driving mode, in order to allow the vehicle to travel autonomously, the autonomous driving control unit 12 determines the host vehicle and its surroundings on the basis of information obtained from the surroundings detection system 14, which includes various sensors and surroundings imaging cameras. Additionally, the autonomous driving control unit 12 performs an autonomous driving control process that controls the actuators 36, which control how much the accelerator pedal is depressed, how much the brake pedal is depressed, and the steering angle in accordance with the determination results. In the autonomous driving control process, the autonomous driving control unit 12 generates, on the basis of the surroundings of the vehicle and map information, a travel plan following a preset target route and controls driving such that the vehicle travels autonomously in accordance with the generated travel plan.

Furthermore, the autonomous driving control unit 12 can store information indicating the state of travel operations of the vehicle and output the stored information indicating the state of travel operations of the vehicle. The information representing the state of travel operations of the vehicle is information indicating the manual driving state, in which the vehicle is manually driven by an occupant, or information indicating the autonomous driving state, in which the vehicle is automatically driven by the autonomous driving control unit 12.

Furthermore, the autonomous driving control unit 12 outputs predetermined information relating to assisting the driving of the vehicle. Examples of the predetermined information include information indicating the start of the autonomous driving control process and information indicating the end of the autonomous driving control process.

For example, in the manual driving mode in which the vehicle is driven by an occupant, the autonomous driving control unit 12 can automatically start the autonomous driving control process depending on the behavior of the vehicle and the surroundings to assist the driving of the vehicle by the occupant. In this case, the autonomous driving control unit 12 outputs the information indicating the start of the autonomous driving control process. Furthermore, when the autonomous driving control unit 12 is instructed by the occupant to switch from the manual driving mode in which the vehicle is driven by the occupant to the autonomous driving mode in which the vehicle is driven by the autonomous driving control process, the autonomous driving control unit 12 outputs information (predetermined information indicating the start of the autonomous driving control process) indicating that a handover of the driving responsibility will take place.

Furthermore, while executing the autonomous driving control process, the autonomous driving control unit 12 can perform a process that automatically ends (cancels) the autonomous driving control process depending on the behavior of the vehicle and the surroundings and prompts the occupant to manually drive the vehicle. In this case, the autonomous driving control unit 12 outputs information indicating the end of the autonomous driving control process in order to prompt the occupant to manually drive the vehicle. Furthermore, when the autonomous driving control unit 12 is instructed by the occupant to switch from the autonomous driving mode in which the vehicle is driven by the autonomous driving control process to the manual driving mode in which the vehicle is driven by the occupant, the autonomous driving control unit 12 outputs information (predetermined information indicating the end of the autonomous driving control process) indicating that a handover of the driving responsibility will take place.

Note that the autonomous driving control unit 12 may include a communication device by which information relating, for example, to the surroundings of the vehicle is transmitted between the vehicle and the outside of the vehicle. Examples of the communication device include a communication device that receives information relating to road conditions by road-to-vehicle communication, such as a wireless communication device utilizing dedicated short-range communications (DSRC). Furthermore, examples of information relating to road conditions (the surroundings of the vehicle) and received by road-to-vehicle communication include information indicating the curvature of slow lanes, the shape and condition of lanes and roads such as road cant, the positional relationship of the vehicle relative to lanes, the positional relationships of other vehicles that are traveling, and the traffic volume in the area around the vehicle. Furthermore, the autonomous driving control unit 12 can include a navigation system as an example of a device for obtaining information relating to the surroundings of the vehicle.

The surroundings detection system 14 has several types of sensors and surroundings imaging cameras and detects the surroundings of the vehicle in order for the autonomous driving control unit 12 to autonomously drive the vehicle. The surroundings detection system 14 detects, as the surroundings of the vehicle, imaging information captured by the surroundings imaging cameras, obstacle information acquired by radar, and obstacle information acquired by laser imaging detection and ranging (LIDAR). The surroundings include, for example, the positions of the white line markings of a slow lane relative to the vehicle, the position of the lane center, the road width, the road shape, and the situation of obstacles around the vehicle. Note that examples of the road shape include the curvature of slow lanes, changes in road surface grade effective for sensor estimation, and undulations. Furthermore, examples of the situation of obstacles around the vehicle include information distinguishing between stationary obstacles and moving obstacles, the position of an obstacle relative to the vehicle, the moving direction of an obstacle relative to the vehicle, and the relative velocity of an obstacle relative to the vehicle.

The seat position changing unit 28 includes actuators for changing the facing directions and positions of plural (in the present exemplary embodiment, four) seats that are disposed in the vehicle and whose positions and facing directions can be changed. Namely, the seat arrangement can be changed by the seat position changing unit 28. In the present exemplary embodiment, the seats are placed in two rows each in the vehicle width direction and the vehicle front and rear direction, and the seat position changing unit 28 changes the positions and facing directions of the seats.

In the present exemplary embodiment, when the autonomous driving control unit 12 switches the vehicle from the autonomous driving mode to the manual driving mode, the autonomous driving control unit 12 controls the seat position changing unit 28 so as to change the seat arrangement to a manual driving mode seat arrangement. Furthermore, when the autonomous driving control unit 12 switches the vehicle from the manual driving mode to the autonomous driving mode, the autonomous driving control unit 12 also controls the seat position changing unit 28 so as to change the seat arrangement to an autonomous driving mode seat arrangement.

Figure 2A:
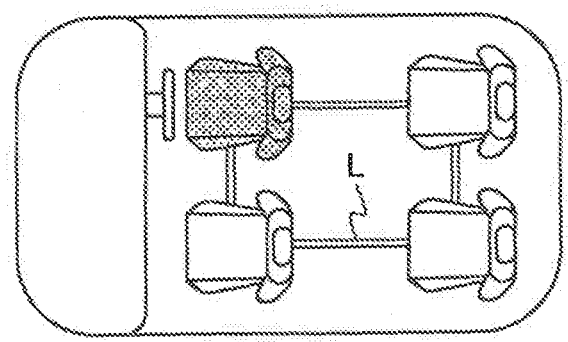
FIG. 2A is a drawing showing a normal seat arrangement in which seats have not changed positions or facing directions.
Figure 2B:
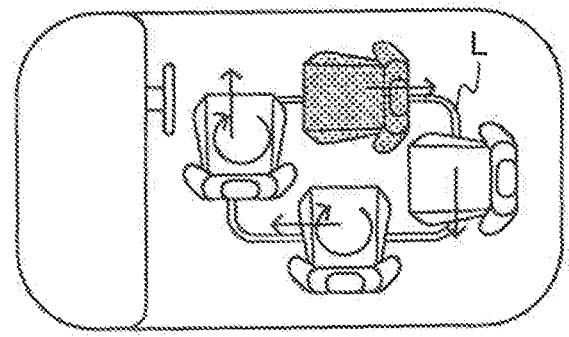
FIG. 2B is a drawing showing the positions and facing directions of the seats being changed when switching to an autonomous driving mode.
Figure 2C:
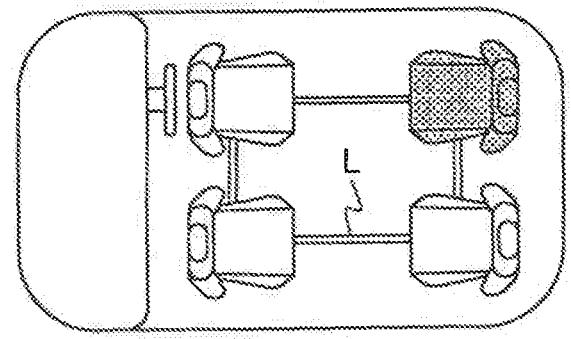
FIG. 2C is a drawing showing a face-to-face seat arrangement.
Figure 3A:
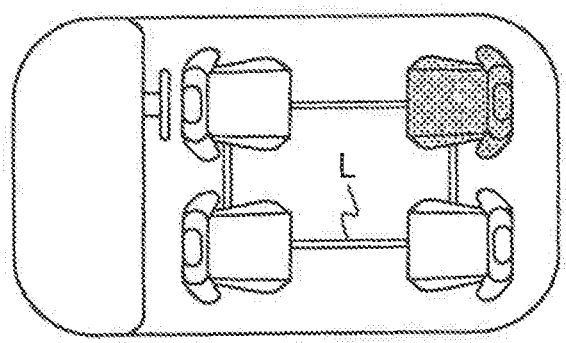
FIG. 3A is drawing showing the face-to-face seat arrangement.
Figure 3B:
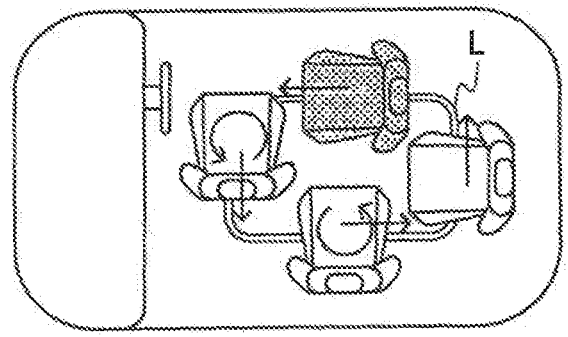
FIG. 3B is a drawing showing the positions and facing directions of the seats being changed when switching to a manual driving mode.
Figure 3C:
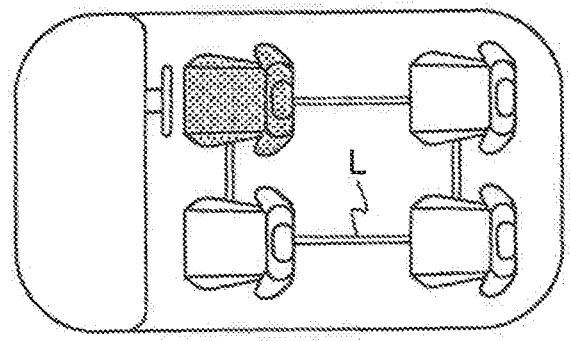
FIG. 3C is a drawing showing the normal seat arrangement.

In the present exemplary embodiment, the seat arrangement shown in FIG. 2C is applied as the autonomous driving mode seat arrangement, and the seat arrangement shown in FIG. 3C is applied as the manual driving mode seat arrangement. Namely, when switching to the autonomous driving mode, the seat position changing unit 28 rotates the facing directions of the seats positioned on the vehicle front and rear side on the vehicle width direction opposite side of a predetermined driving position and moves each seat clockwise along a rail L (FIG. 2B) from a normal seat arrangement (the arrangement shown in FIG. 2A in which all the seats face the vehicle traveling direction). Because of this, the seat arrangement can be changed to a face-to-face seat arrangement in which the seats on the vehicle front side face the opposite direction of the vehicle traveling direction and the seats on the vehicle rear side face the vehicle traveling direction (FIG. 2C). In the example shown in FIG. 2A to FIG. 2C, the rail L on which the seats move is disposed, and the positions of the seats relative to the vehicle can be changed along the rail L. When switching to the manual driving mode, the seat position changing unit 28 rotates the facing directions of the seats positioned on the vehicle front side and moves each seat counter-clockwise along the rail L (FIG. 3B) from the face-to-face seat arrangement shown in FIG. 3A. Because of this, as shown in FIG. 3C, the seat arrangement can be returned to the normal seat arrangement. Note that, when changing the facing directions and positions of the seats, the seat position changing unit 28 does so without the seats interfering with each other. Furthermore, in FIG. 2A to FIG. 3C, the seat in which the driver sits is indicated by a dot pattern.

In this way, in the present exemplary embodiment, when the autonomous driving control unit 12 switches the vehicle to the manual driving mode, the autonomous driving control unit 12 controls the seat position changing unit 28 such that a first seat in which a first occupant who is a driver sits faces the vehicle traveling direction on one predetermined side in the vehicle width direction on the vehicle front side, a second seat in which a second occupant sits faces the vehicle traveling direction in a position on the vehicle front side on the other side (the side opposite the one predetermined side), a third seat in which a third occupant sits faces the vehicle traveling direction in a position on the vehicle rear side on the other side, and a fourth seat in which a fourth occupant sits faces the vehicle traveling direction in a position on the vehicle rear side on the one predetermined side. Further, when the autonomous driving control unit 12 switches the vehicle to the autonomous driving mode, the autonomous driving control unit 12 controls the seat position changing unit 28 such that the first seat (in which the driver is seated) faces the vehicle traveling direction in a position on the vehicle rear side on the one predetermined side, the second seat faces the opposite direction of the vehicle traveling direction in a position on the vehicle front side on the one predetermined side, the third seat faces the opposite direction of the vehicle traveling direction in a position on the vehicle front side on the other side, and the fourth seat faces the vehicle traveling direction in a position on the vehicle rear side on the other side.

Note that, in the present exemplary embodiment, the predetermined driving position is a predetermined position, among the positions of the four seats, in the cabin where a steering or other maneuvering system is disposed, and corresponds to the driving position in a typical vehicle. In the case of a right-hand-drive car that travels on the left side of a road, the predetermined driving position corresponds to a position near the center of the road on the vehicle front side.

Figure 4:
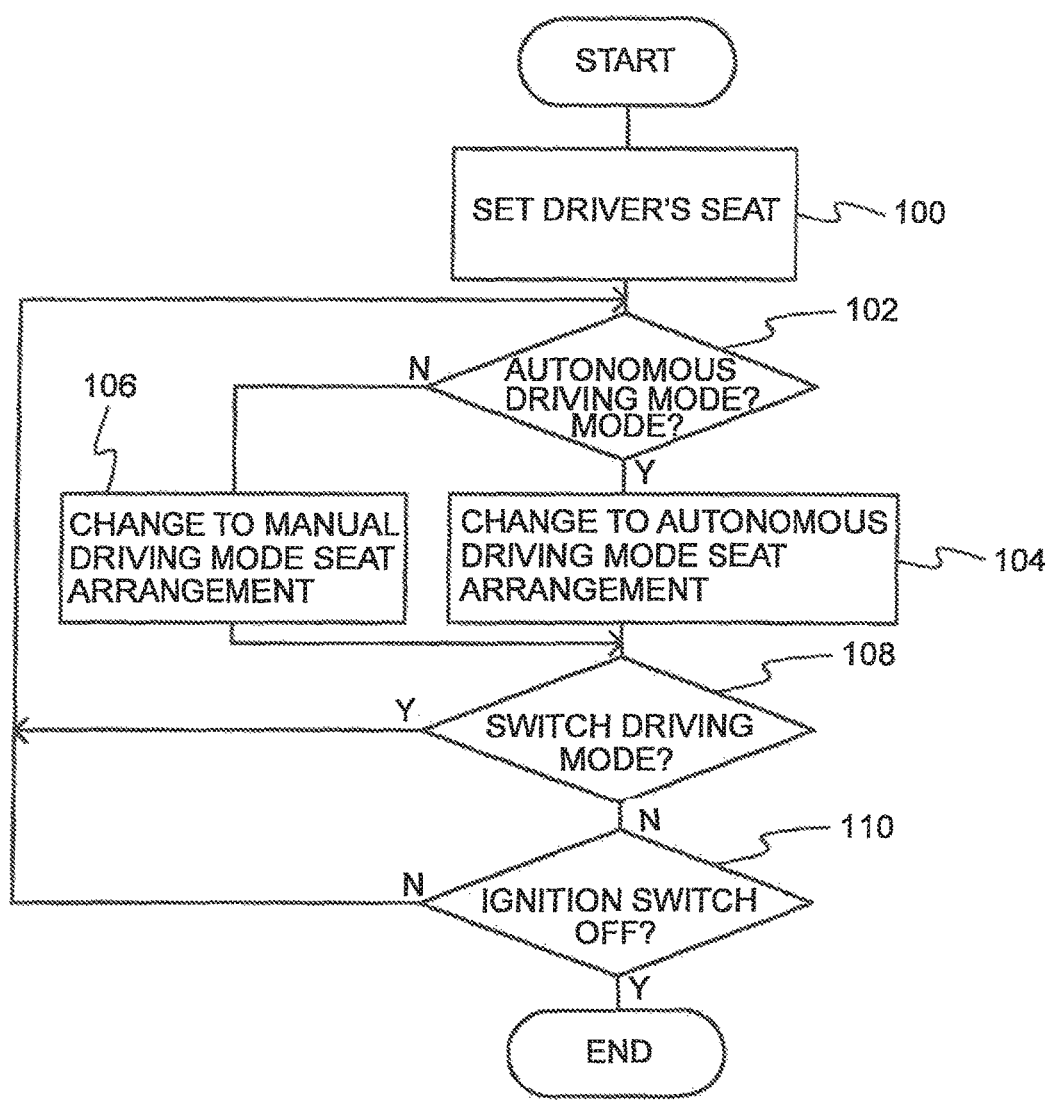
FIG. 4 is a flowchart showing a flow of a process performed by an autonomous driving control unit of the vehicle seat control system according to the exemplary embodiment.

Next, a specific process performed by the autonomous driving control unit 12 of the vehicle seat control system 10 according to the present exemplary embodiment will be described. FIG. 4 is a flowchart showing a flow of the process performed by the autonomous driving control unit 12 of the vehicle seat control system 10 according to the present exemplary embodiment. Note that the process in FIG. 4 starts, for example, when an ignition switch (not shown in the drawings) is switched ON.

In step 100 the autonomous driving control unit 12 sets a seat for the driver, and then the autonomous driving control unit 12 proceeds to step 102. In the present exemplary embodiment, the autonomous driving control unit 12 sets any seat of the four seats as the seat for the driver. For example, the autonomous driving control unit 12 sets, as the seat for the driver, the seat in the position where the steering or other maneuvering system is located. The autonomous driving control unit 12 may also have an occupant operate a control panel (not shown in the drawings) and set the seat for the driver.

In step 102 the autonomous driving control unit 12 determines whether or not to switch to the autonomous driving mode. For example, the autonomous driving control unit 12 determines whether or not an event in which it outputs the information indicating the start of the autonomous driving control process or the information indicating the end of the autonomous driving control process has occurred. When an event in which the autonomous driving control unit 12 outputs the information indicating the start of the autonomous driving control process has occurred, an affirmative determination is made and the autonomous driving control unit 12 proceeds to step 104, and when an event in which the autonomous driving control unit 12 outputs the information indicating the end of the autonomous driving control process has occurred, a negative determination is made and the autonomous driving control unit 12 proceeds to step 106.

In step 104 the autonomous driving control unit 12 controls the seat position changing unit 28 so as to change the seat arrangement to the autonomous driving mode seat arrangement, and then the autonomous driving control unit 12 proceeds to step 108. Namely, the seat position changing unit 28 rotates the facing directions of the seats positioned on the vehicle front and rear side on the vehicle width direction opposite side of the predetermined driving position, and moves each seat clockwise along the rail L as shown in FIG. 2B from the normal seat arrangement (a seat arrangement in which all the seats face the vehicle traveling direction) shown in FIG. 2A. Furthermore, when moving each seat, the seat position changing unit 28 changes the positions and facing directions of the seats without the seats interfering with each other. Because of this, as shown in FIG. 2C, the seat arrangement is changed to the face-to-face seat arrangement in which the seats on the vehicle front side face the opposite direction of the vehicle traveling direction and the seats on the vehicle rear side face the vehicle traveling direction. In this way, in the autonomous driving mode seat arrangement, the driver can relax because the driver moves to a position on the vehicle rear side while facing the vehicle traveling direction. Furthermore, when the vehicle is switched back to the manual driving mode and the driver resumes driving, the burden of redirecting his/her mental faculties and adjusting his/her sense of physical orientation can be alleviated because the driver is already facing the vehicle traveling direction, and it becomes possible to safely switch between driving modes.

In step 106 the autonomous driving control unit 12 controls the seat position changing unit 28 so as to change the seat arrangement to the manual driving mode seat arrangement, and then the autonomous driving control unit 12 proceeds to step 108. Namely, the seat position changing unit 28 rotates the facing directions of the seats positioned on the vehicle front side and moves each seat counter-clockwise along the rail L as shown in FIG. 3B from the face-to-face seat arrangement shown in FIG. 3A. Furthermore, when moving the seats, the seat position changing unit 28 changes the positions and facing directions of the seats without the seats interfering with each other. Because of this, as shown in FIG. 3C, the seat arrangement can be returned to the normal seat arrangement. In this way, in the manual driving mode seat arrangement, the driver moves to a position on the vehicle front side while facing the vehicle traveling direction, so the amount of time the driver needs to redirect his/her mental faculties and adjust his/her sense of physical orientation can be shortened, and the driver can quickly shift to a drivable state. Consequently, the present exemplary embodiment may alleviate the burden of redirecting one's mental faculties and adjusting one's sense of physical orientation, and may safely switch between driving modes.

In step 108 the autonomous driving control unit 12 determines whether or not to switch driving modes. The autonomous driving control unit 12 determines whether or not an event in which it outputs the information indicating the start of the autonomous driving control process or the information indicating the end of the autonomous driving control process has occurred. When an affirmative determination is made, the autonomous driving control unit 12 returns to step 102 and repeats the processes described above, and when a negative determination is made, the autonomous driving control unit 12 proceeds to step 110.

In step 110 the autonomous driving control unit 12 determines whether or not the ignition switch not shown in the drawings has been switched OFF. When a negative determination is made, the autonomous driving control unit 12 returns to step 102 and repeats the processes described above, and when an affirmative determination is made, the autonomous driving control unit 12 ends the processes.

Note that, in the above exemplary embodiment, as a method to set the seat for the driver, the autonomous driving control unit 12 sets the seat located in the position where the maneuvering system is located at the time when the ignition switch is switched ON or the seat set using a control panel or the like. However, the setting method is not limited to this. For example, when shifting from the manual driving mode to the autonomous driving mode, the autonomous driving control unit 12 may also read information relating to the suitability of the occupants to drive and select a driver (namely, the seat for the driver) on the basis of the reading results.

Figure 5:
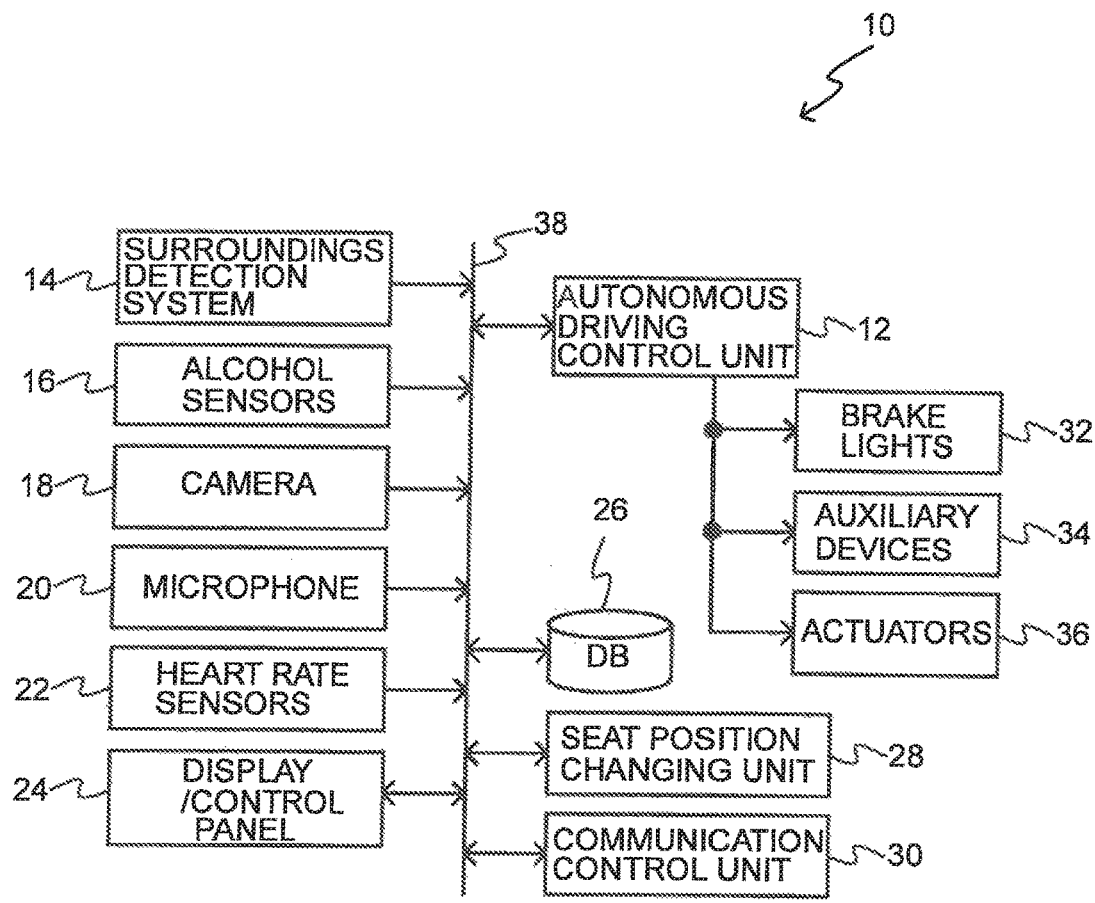
FIG. 5 is a block diagram showing the configuration of a modification of the vehicle seat control system according to the exemplary embodiment.

Here, an example will be described where the autonomous driving control unit 12 selects the driver. FIG. 5 is a block diagram showing the configuration of a modification of the vehicle seat control system 10 according to the above exemplary embodiment. Note that detailed description regarding configurations that are the same as those in the above exemplary embodiment will be omitted.

As shown in FIG. 5, in this modification, the vehicle seat control system 10 according to the above exemplary embodiment is further equipped with a configuration for reading various types of information relating to the occupants as conditions for determining whether or not the occupants are suitable to be the driver. Specifically, alcohol sensors 16, a camera 18, a microphone 20, heart rate sensors 22, a display/control panel 24, and a database (DB) 26 are disposed as a reading unit and are connected to the on-board network 38.

The alcohol sensors 16 are disposed in positions, such as, for example, in the headrests, where it is easy to detect the breath of the occupants. The alcohol sensors 16 detect whether or not the occupants sitting in the seats have been drinking alcohol.

The camera 18 is disposed in a position, such as, for example, in the ceiling of the cabin, where it can capture images of the facial expressions of the occupants sitting in the seats. The camera 18 captures images of the occupants. In this modification, the autonomous driving control unit 12 determines the physical condition of the occupants from the complexions and facial expressions of the occupants using the images captured by the camera 18. Furthermore, the autonomous driving control unit 12 may also use the images captured by the camera 18 for face authentication to identify the occupants riding in the vehicle.

The microphone 20 is disposed in a position where it can detect the voices of the occupants sitting in the seats. The microphone 20 detects the voices of the occupants. In this modification, the autonomous driving control unit 12 detects whether or not the occupants want to drive by having the occupants say toward the microphone 20 whether or not they want to drive. Note that the microphone 20 may also be used for voice authentication by voice recognition and to input various types of information.

The heart rate sensors 22 are disposed in the seats and detect the heart rates of the occupants. In this modification, the autonomous driving control unit 12 determines the physical condition of the occupants by using the heart rate sensors 22 to detect the heart rates of the occupants.

The display/control panel 24 is disposed in the center console section in the cabin, for example, in a position where the occupants sitting in the seats can operate the display/control panel 24 and see what is displayed on the display/control panel 24. The display/control panel 24 is equipped with keys and switches for inputting various types of information and is also equipped with a display such as a monitor that displays various types of information. A touch panel in which a display and a control panel are integrated, for example, may also be applied as the display/control panel 24.

The database 26 stores, as a database, information input by the occupants operating the display/control panel 24. For example, the database 26 stores various types of personal information, such as whether or not the occupants have a driver's license, individual characteristics, preferences, and driving skills. Note that, in regard to the information stored in the database 26 that the autonomous driving control unit 12 may also be configured to acquire information stored in a cloud-based or other external server database. The autonomous driving control unit 12 may also acquire information from a cloud database and store the information in the database 26.

Furthermore, as shown in FIG. 5, a communication control unit 30 may also be connected to the on-board network 38. By connecting the communication control unit 30, the vehicle seat control system 10 may communicate with a cloud-based or other server via a mobile telephone communication network or other network and for various types of information to be transmitted between the vehicle seat control system 10 and the external server.

As mentioned above, the positions and facing directions of the seats can be changed by the seat position changing unit 28, but when shifting from the autonomous driving mode to the manual driving mode, it is not always the case that the previous driver is suitable to drive.

Therefore, in this modification, the autonomous driving control unit 12 is configured to read, from the occupants, various types of information relating to the occupants and select an occupant who is suitable to be the next driver. For example, the autonomous driving control unit 12 reads, from the occupants, information relating to the suitability of the occupants to drive. This information is at least one of personal information including whether or not the occupants have a driver's license, whether or not the occupants have been drinking alcohol, the physical condition of the occupants, the facing directions and positions of the seats, the occupants' driving skills relating to the travel route, driving distribution, and whether or not the occupants want to drive.

Specifically, in this modification, the autonomous driving control unit 12 utilizes, as determination conditions, whether or not the occupants have a driver's license, whether or not the occupants have been drinking alcohol, the physical condition of the occupants, the facing directions and the positions of the seats, the occupants' driving skills relating to the travel route, driving distribution, and whether or not the occupants want to drive, evaluates the occupants using predetermined evaluation values, and selects an occupant who is suitable to drive from among the occupants riding in the vehicle. Note that, in regard to the above determination conditions, it is not necessary to include all the determination conditions, and the determination conditions may be appropriately combined. For example, the autonomous driving control unit 12 may evaluate the occupants using determination conditions excluding the facing directions and positions of the seats, or may apply other combinations.

In this modification, as shown in FIG. 6, regarding whether or not the occupants have a driver's license, information indicating this is registered beforehand in the database 26, and the autonomous driving control unit 12 identifies an occupant and reads, from the database 26, the information indicating whether or not the corresponding occupant has a driver's license. Then, if the corresponding occupant does not have a driver's license, the autonomous driving control unit 12 excludes that occupant from the candidates for driver. At this time, for example, the autonomous driving control unit 12 may identify the occupant using face authentication technology from the images captured by the camera 18, or may identify the occupant by means of personal information relating to the occupants sitting in the seats that has been input by the occupants operating the display/control panel 24.

Furthermore, regarding whether or not the occupants have been drinking alcohol, the autonomous driving control unit 12 reads, from the occupants, information indicating whether or not the occupants have been drinking alcohol by acquiring the detection results of the alcohol sensors 16 and detecting whether or not alcohol is present in the breaths of the occupants. Then, if a given occupant has been drinking alcohol, the autonomous driving control unit 12 excludes that occupant from the candidates for driver in the same way as when an occupant does not have a driver's license.

Furthermore, regarding the physical condition of the occupants, the autonomous driving control unit 12 reads, from the occupants, information indicating the physical condition of the occupants by acquiring the detection results of the heart rate sensors 22 and detecting the physical condition of the occupants. For example, the autonomous driving control unit 12 detects the physical condition of the occupants by determining whether or not the heart rates of the occupants are in a predetermined normal heart rate range. The autonomous driving control unit 12 may also detect the physical condition of the occupants by detecting, from the imaging results of the camera 18, whether or not the occupants' eyes are open, the number of times the occupants blink, and the emotions of the occupants. Then, in this modification, the autonomous driving control unit 12 assigns 5 points as a weighting to an occupant whose physical condition is good and assigns 0 points as a weighting to an occupant whose physical condition is not good. For example, the autonomous driving control unit 12 evaluates the physical condition of a given occupant as good in a case where the heart rate of that occupant is in the predetermined range or in a case where, in addition to this, the eyes of that occupant are open, the number of times that that occupant blinks is in the range of a predetermined number of blinks, and the facial expression of that occupant is a predetermined facial expression.

Furthermore, the facing directions and positions of the seats may be obtained by functioning the camera 18 as a detection unit and that acquire images by the camera 18 to detect the facing directions and positions of the seats. Further, the facing directions and positions of the seats may be detected from the controlled states of the seats by the seat position changing unit 28. Further, in this modification, the autonomous driving control unit 12 assigns 5 points as a weighting to the occupant sitting in the seat facing the vehicle traveling direction and positioned on the vehicle rear side on the vehicle width direction driving position side (a seat facing forward at rear of D side). Furthermore, the autonomous driving control unit 12 assigns 3 points as a weighting to the occupant sitting in the seat facing the vehicle traveling direction and positioned on the vehicle rear side on the vehicle width direction opposite side (a seat facing forward at rear of P side). Furthermore, the autonomous driving control unit 12 assigns 1 point as a weighting to the occupants sitting in the other seats facing the opposite direction of the vehicle traveling direction (facing rearward). The autonomous driving unit 12 performs the weighting such that the occupants sitting in the seats facing the vehicle traveling direction are evaluated as suitable to be the driver because the driver needs time to redirect his/her mental faculties and adjust his/her sense of physical orientation before becoming accustomed to the behavior of the vehicle and the scenery when the facing directions of the seats are changed. Furthermore, the autonomous driving control unit 12 reduces the weighting for the occupant in the seat facing the vehicle traveling direction but whose distance from the driving position is greater. Note that the above "D" denotes the driving position (driver's seat), and "P" denotes the opposite position from the driving position (front passenger seat).

Furthermore, the occupants' driving skills relating to the travel route are registered beforehand in the database 26, and the autonomous driving control unit 12 identifies an occupant and reads, from the database 26, the information indicating the driving skills of the corresponding occupant. Then, the autonomous driving control unit 12 assigns 2 points as a weighting in a case where the corresponding occupant is a skillful driver, assigns 1 point as a weighting in a case where the corresponding occupant is a normal driver, and assigns 0 points as a weighting in a case where the corresponding occupant is a poor driver.

Furthermore, regarding driving distribution, driving history information is stored beforehand in the database 26, and the autonomous driving control unit 12 identifies an occupant and reads, from the database 26, the driving history information of the corresponding occupant as information indicating driving distribution. Then, the autonomous driving control unit 12 assigns 2 points as a weighting in a case where the corresponding occupant has no driving history and has not yet driven the vehicle, and assigns 0 points as a weighting in a case where the corresponding occupant has a driving history and has driven the vehicle. Here, the autonomous driving control unit 12 can also set the weighting in view of the fact that, for example, a father drives more frequently.

Furthermore, regarding whether or not the occupants want to drive, the autonomous driving control unit 12 reads, from the occupants, information indicating whether or not the occupants want to drive by detecting whether or not the occupants want to drive by means of voice recognition using the microphone 20 or input from the occupants operating the display/control panel 24. Then, the autonomous driving control unit 12 assigns 5 points as a weighting to an occupant who wants to drive and assigns 0 points as a weighting to an occupant who does not want to drive.

Then, the autonomous driving control unit 12 evaluates the occupants who are suitable to drive by adding up the evaluation values described above. In the above example, the larger an evaluation value is, the more suitable the corresponding occupant is to drive.

Note that, if the sum totals of the evaluation values of two or more occupants end up being the same, the autonomous driving control unit 12 may give priority to the occupant having a higher evaluation value relating to a predetermined condition, such as, for example, physical condition or the facing direction and position of the seat. Furthermore, the numbers of points for the weightings are given as an example and are not limited to the above numbers of points. Furthermore, an example has been described above where the larger an evaluation value is, the more suitable the corresponding occupant is to drive, but the evaluation values may also be conversely set such that the smaller an evaluation value is, the more suitable the corresponding occupant is to drive.

In this way, when switching from the manual driving mode to the autonomous driving mode, the present modification may safely switch to the autonomous driving mode by evaluating and selecting an occupant who is suitable to be the next driver.

Note that, in the above exemplary embodiment, a case in which the present disclosure is applied to a vehicle having four seats, has been described. However, the present disclosure is not limited to the above, and may also be applied to, for example, a vehicle having two seats or a vehicle having five or more seats.

Figure 7A:
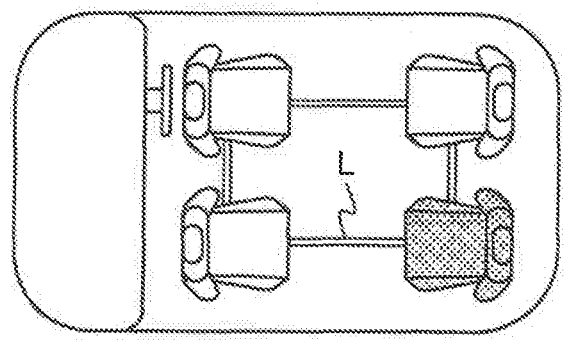
FIG. 7A is a drawing showing a seat arrangement, in the autonomous driving mode, in which the seat in which the driver sits faces the vehicle traveling direction in a position on the vehicle rear side on the vehicle width direction opposite side of a driving position.
Figure 7B:
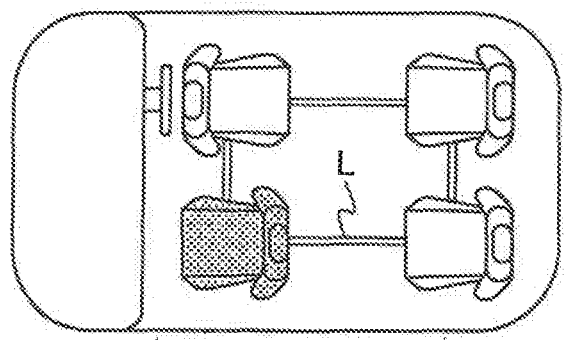
FIG. 7B is a drawing showing a seat arrangement in which the seat in which the driver sits faces the vehicle traveling direction in a position on the vehicle front side on the vehicle width direction opposite side of the driving position.

Furthermore, in the above exemplary embodiment, a case in which the seat the driver sits in the autonomous driving mode faces the vehicle traveling direction in a position on the vehicle rear side on the vehicle width direction driving position side, has been described. However, the position of the seat in which the driver sits in the autonomous driving mode is not limited to this. Namely, at least one of the positions or facing directions of the seats may be changed such that in the manual driving mode the first seat in which the driver sits faces the vehicle traveling direction in the driving position, and in the autonomous driving mode the first seat faces the vehicle traveling direction and without the other seats interfering with the first seat. For example, as shown in FIG. 7A, the seat in which the driver sits in the autonomous driving mode may face the vehicle traveling direction in a position on the vehicle rear side (the row on the vehicle rear side) on the vehicle width direction opposite side (the front passenger seat side) of the driving position. As shown in FIG. 7B, the seat in which the driver sits in the autonomous driving mode may face the vehicle traveling direction in a position on the vehicle front side on the vehicle width direction opposite side (the front passenger seat side) of the driving position. The autonomous driving mode seat arrangement may also be such that the seat in which the driver sits in the autonomous driving mode remains in the same position and faces the same direction as in the manual driving mode but at least one of the positions or facing directions of the other seats is changed. In any case, in the autonomous driving mode the driver faces the traveling direction, so like in the above exemplary embodiment, the time it takes to reach a state suitable for driving may be shortened when switching from the autonomous driving mode to the manual driving mode.

Furthermore, in the above exemplary embodiment, a case in which the seat arrangement can be changed to the normal seat arrangement (an arrangement in which all the seats face the vehicle traveling direction) and the face-to-face seat arrangement, has been described. However, the seat arrangement is not limited thereto. For example, the seat arrangement may also be changed to a seat arrangement in which the seats on the vehicle front side face the vehicle traveling direction and the seats on the vehicle rear side face the opposite direction of the vehicle traveling direction. The seat arrangement may also be changed to other seat arrangements.

Figure 8A:
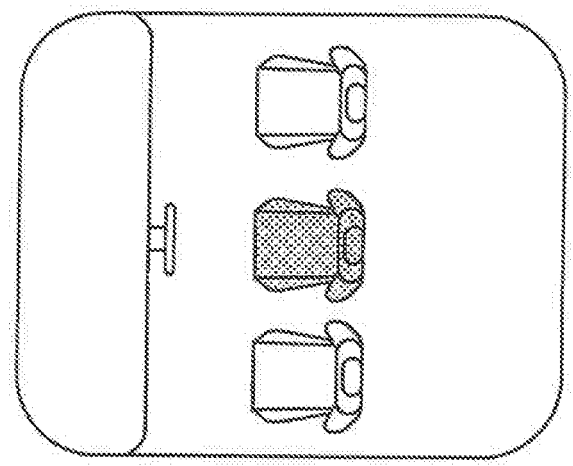
FIG. 8A is a drawing showing plural seats placed in a single row in the vehicle width direction.
Figure 8B:
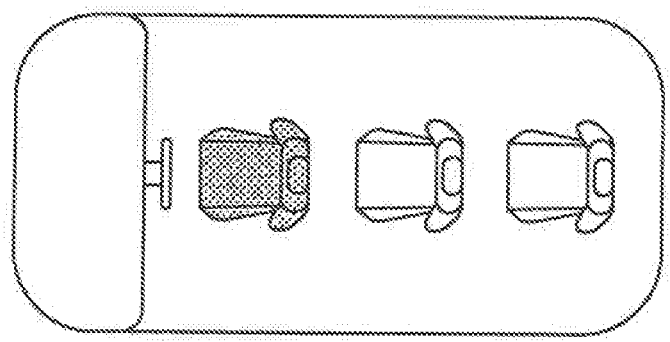
FIG. 8B is a drawing showing plural seats placed in a single row in the vehicle front and rear direction.

Furthermore, in the above exemplary embodiment, a case in which the present disclosure is applied to four seats placed in two rows each in the vehicle width direction and the vehicle front and rear direction, has been described. However, the placement of the plural seats is not limited to this. For example, the present disclosure may be applied to plural seats placed in two rows each in the vehicle width direction and three rows each in the vehicle front and rear direction, plural seats placed in three rows in the vehicle width direction and two rows in the vehicle front and rear direction, and plural seats placed in two rows in the vehicle width direction on the vehicle front side and three rows in the vehicle width direction on the vehicle rear side. Further, the present disclosure may be applied to plural seats placed in one row in the vehicle width direction as shown in FIG. 8A or plural seats placed in one row in the vehicle front and rear direction as shown in FIG. 8B. In these cases also, at least one of the positions or facing directions of the seats may be changed such that when switching from the autonomous driving mode to the manual driving mode, the first seat faces the vehicle traveling direction in the driving position and when switching from the manual driving mode to the autonomous driving mode, the first seat faces the vehicle traveling direction and without the other seats interfering with the first seat.

Furthermore, the process in FIG. 4 performed by the autonomous driving control unit 12 in the above exemplary embodiment may be a software process performed by a computer executing a program or may be a process performed by hardware. The process may also be a process combining both software and hardware. Furthermore, the program in the case where the process is performed by software may be stored in various types of storage media and distributed.

Moreover, the present disclosure is not limited the above and may be modified and implemented in various ways in addition to what is described above without departing from the spirit thereof.

What is claimed is:

1. An apparatus comprising:
   a microcomputer configured to switch a driving mode of a vehicle from a first driving mode to a second driving mode different from the first driving mode, or from the second driving mode to the first driving mode; and
   actuators on the vehicle, the actuators configured to (i) change a position of a first seat of the vehicle, in a case in which the microcomputer switches the first driving mode to the second driving mode, and (ii) change the position of the first seat to a position which is occupied by a second seat different from the first seat during the second driving mode, in a case in which the microcomputer switches the second driving mode to the first driving mode.

2. The apparatus according to claim 1, wherein the actuators move the first seat in a direction that opposes a traveling direction of the vehicle.

3. The apparatus according to claim 1, wherein the first driving mode is a mode in which behavior of the vehicle is controlled based on sensors mounted on the vehicle, and the second driving mode is a mode in which behavior of the vehicle is controlled by operation by a driver of the vehicle.

4. The apparatus according to claim 3, wherein the microcomputer is further configured to select an occupant who is suitable to drive from among occupants riding in the vehicle, in a case in which the microcomputer switches the driving mode from the first driving mode to the second driving mode.

5. The apparatus according to claim 4, wherein the microcomputer selects the occupant who is suitable to drive based on biological information of the occupants riding in the vehicle, positions and facing directions of seats in which the occupants are seated, and information relating to suitability of the occupants.

6. An apparatus comprising:
   a microcomputer configured to switch a driving mode of a vehicle from a first driving mode to a second driving mode different from the first driving mode, or from the second driving mode to the first driving mode; and
   actuators on the vehicle, the actuators configured to (i) change a position of a first seat of the vehicle in a case in which the microcomputer switches the first driving mode to the second driving mode, and (ii) change the position of the first seat and a position of a second seat different from the first seat such that the first seat and the second seat do not interfere with each other, in a case in which the microcomputer switches the second driving mode to the first driving mode.

7. The apparatus according to claim 6, wherein the actuators move the first seat in a direction that opposes a traveling direction of the vehicle.

8. The apparatus according to claim 6, wherein the first driving mode is a mode in which behavior of the vehicle is controlled based on sensors mounted on the vehicle, and the second driving mode is a mode in which behavior of the vehicle is controlled by operation by a driver of the vehicle.

9. The apparatus according to claim 8, wherein the microcomputer is further configured to select an occupant who is suitable to drive from among occupants riding in the vehicle, in a case in which the microcomputer switches the driving mode from the first driving mode to the second driving mode.

10. The apparatus according to claim 9, wherein the microcomputer selects the occupant who is suitable to drive based on biological information of the occupants riding in the vehicle, positions and facing directions of the seats in which the occupants are seated, and information relating to suitability of the occupants.

11. A method of controlling a vehicle, the method comprising:
    switching, by a microcomputer, a driving mode of the vehicle from a first driving mode to a second driving mode different from the first driving mode, or from the second driving mode to the first driving mode;
    changing, by actuators of the vehicle, a position of a first seat of the vehicle, in a case in which the microcomputer switches the first driving mode to the second driving mode; and
    changing, by the actuators, the position of the first seat to a position which is occupied by a second seat different from the first seat during the second driving mode, in a case in which the microcomputer switches the second driving mode to the first driving mode.

12. The method according to claim 11, wherein the actuators move the first seat in a direction that opposes a traveling direction of the vehicle.

13. The method according to claim 11, wherein the first driving mode is a mode in which behavior of the vehicle is controlled based on sensors mounted on the vehicle, and the second driving mode is a mode in which behavior of the vehicle is controlled by operation by a driver of the vehicle.

14. The method according to claim 13, further comprising:
    selecting, by the microcomputer, an occupant who is suitable to drive from among occupants riding in the vehicle, in a case in which the driving mode from the first driving mode to the second driving mode.

15. The method according to claim 14, wherein the occupant who is suitable to drive is selected based on biological information of the occupants riding in the vehicle, positions and facing directions of seats in which the occupants are seated, and information relating to suitability of the occupants.

16. A method of controlling a vehicle, the method comprising:
    switching, by a microcomputer, a driving mode of the vehicle from a first driving mode to a second driving mode different from the first driving mode, or from the second driving mode to the first driving mode;
    changing, by actuators of the vehicle, a position of a first seat of the vehicle in a case in which the microcomputer switches the first driving mode to the second driving mode; and
    changing, by the actuators, the position of the first seat and a position of a second seat different from the first seat such that the first seat and the second seat do not interfere with each other, in a case in which the microcomputer switches the second driving mode to the first driving mode.

17. The method according to claim 16, wherein the actuators move the first seat in a direction that opposes a traveling direction of the vehicle.

18. The method according to claim 16, wherein the first driving mode is a mode in which behavior of the vehicle is controlled based on sensors mounted on the vehicle, and the second driving mode is a mode in which behavior of the vehicle is controlled by operation by a driver of the vehicle.

19. The method according to claim 18, further comprising:

selecting, by the microcomputer, an occupant who is suitable to drive from among occupants riding in the vehicle, in a case in which the driving mode from the first driving mode to the second driving mode.

20. The method according to claim 19, wherein the occupant who is suitable to drive is selected based on biological information of the occupants riding in the vehicle, positions and facing directions of the seats in which the occupants are seated, and information relating to suitability of the occupants.

* * * * *